Figure 1:
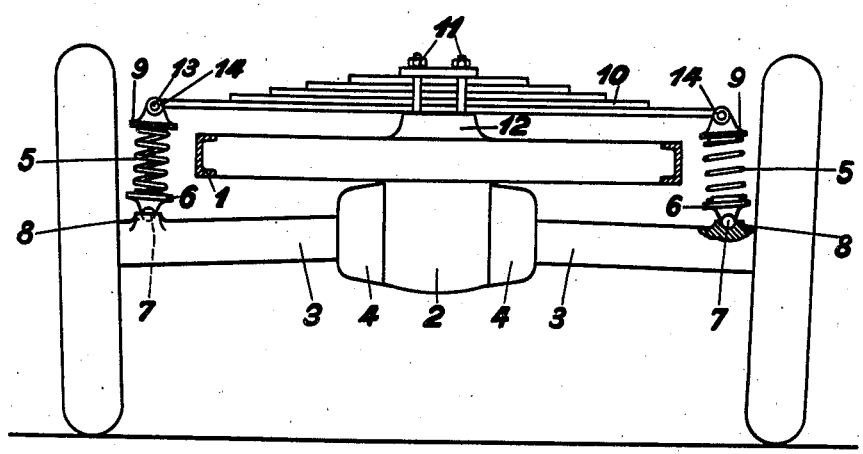

Sept. 21, 1937.                E. STUMP                2,093,822
                ARRANGEMENT OF SPRINGS OF MOTOR CARS
                       Filed Oct. 29, 1935

Inventor: Eugen Stumpf

Patented Sept. 21, 1937

2,093,822

UNITED STATES PATENT OFFICE 2,093,822

ARRANGEMENT OF SPRINGS OF MOTOR CARS

Eugen Stump, Friedrichshafen, Germany, assignor to Maybach-Motorenbau G. m. b. H., Friedrichshafen, Bodensee, Germany Application October 29, 1935, Serial No. 47,203
In Germany November 6, 1934

1 Claim. (Cl. 267—19)

My invention relates to the arrangement of springs of motor cars and has special reference to cars with swing axles or swing wheels.

The main object of my invention is improvement in the spring suspension system with the effect of reduction in weight and better comfort for the passengers.

For this purpose, according to my invention, I provide laminated springs and coil springs and arrange them in such manner that both types of springs act together. The coil springs are so dimensioned that they are adapted to transmit all the forces and shocks occurring to the laminated springs without coming to blocks. At least one third and in maximum two thirds of the energy is intended to be absorbed by the coil springs whereas the remaining two thirds to one third are left to the laminated springs to be counteracted for. I prefer to have the coil springs connected to the swinging portions of the vehicle such as the axles or wheels and to fasten the laminated springs to the sprung portion such as the body of the car.

The advantages connected with my invention are to be seen already when it is applied to one pair of wheels only, but they are greater when all wheels are provided with the new arrangement.

Having given a general description of my invention I now want to point it out more in detail referring to the drawing which represents examples embodying my invention.

Figure 2:
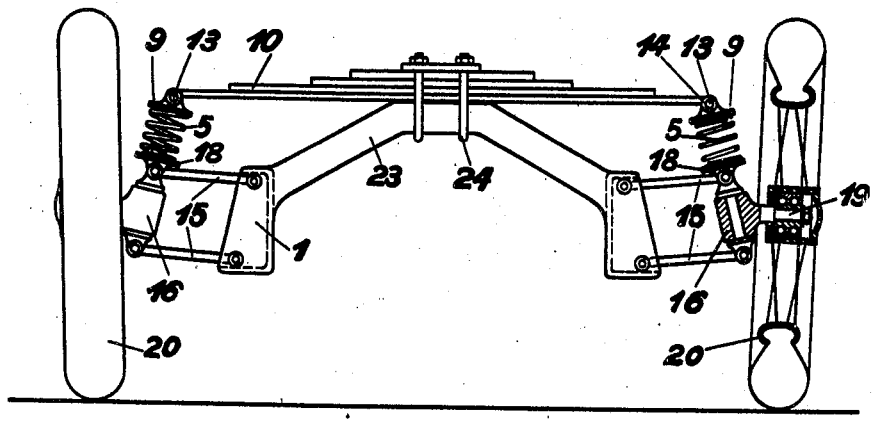

Fig. 1 is an elevation showing rear wheels; Fig. 2 is an elevation showing the front wheels, partly in section.

The frame which carries the body (not shown) is designated at 1. From the rear differential gear case 2 extend the two swing axles 3; the Cardan linkage is assumed to be inside the gear case at 4. Coil spring 5 is provided with end members 6 and 9, respectively. Member 6 is pivoted on a bracket 8 of the axles at 7 and member 9 is pivotally connected at 13 to the end 14 of laminated spring 10. This spring by means of bolts 11 is fastened to a bracket 12 of the gear case 2 and thereby to frame 1.

In Fig. 2 the wheels 20 are mounted on pins 19, and king pins 16 are provided with swinging members 15 for connection with frame 1. There are coil springs 5 having end members 18 pivoted to the upper end of king pin 16, respectively, and also end members 9 pivotally connected to the ends of laminated spring 10. This latter spring is fastened by means of bolts 24 to a transverse element 23 of frame 1.

In both examples coil springs 5 are so dimensioned with regard to laminated springs 10 that they are adapted to transmit all the forces and shocks coming from the wheels to the laminated springs absorbing one third to two thirds of the energy themselves.

I do not want to be limited to the details disclosed or shown in the drawing.

What I claim is:

A spring suspension for vehicles including a pair of wheels, vertically movable axle members supporting the wheels, a supporting member disposed substantially above the axle members, a leaf spring on the support extending transversely between the wheels and having its ends adjacent the wheels, spring retaining members pivotally connected to the ends of the transverse spring and cooperative spring retaining members pivotally connected to the axle members adjacent the wheels, and compressible coil springs supported between the ends of the leaf spring and the axle members adapted to be moved laterally of the wheels by said pivoted spring retaining members.

EUGEN STUMP.